US005623532A

United States Patent [19]
Houde et al.

[11] Patent Number: 5,623,532
[45] Date of Patent: Apr. 22, 1997

[54] HARDWARE AND DATA REDUNDANT ARCHITECTURE FOR NODES IN A COMMUNICATIONS SYSTEM

[75] Inventors: Michel Houde, St. Laurent; Luc Mayrand, Pierrefouds, both of Canada

[73] Assignee: Telefonaktiebolaget LM Ericsson, Stockholm, Sweden

[21] Appl. No.: 372,074

[22] Filed: Jan. 12, 1995

[51] Int. Cl.$^6$ .............................. H04Q 7/24; H04Q 7/34
[52] U.S. Cl. ............................ 379/58; 379/59; 379/60; 455/33.1
[58] Field of Search ................................. 379/58, 59, 60, 379/221, 207, 317; 455/33.1, 33.2; 395/441, 439, 200.05, 200.15; 364/228.3

[56] References Cited

U.S. PATENT DOCUMENTS

| | | | |
|---|---|---|---|
| 5,278,890 | 1/1994 | Beeson, Jr. et al. | 379/57 |
| 5,289,179 | 2/1994 | Beeson, Jr. et al. | 340/826 |
| 5,406,504 | 4/1995 | Denisco et al. | 364/580 |
| 5,526,507 | 6/1996 | Hill | 395/441 |
| 5,555,430 | 9/1996 | Gephardt et al. | 395/800 |

FOREIGN PATENT DOCUMENTS

| | | |
|---|---|---|
| WO93/25051 | 12/1993 | Sweden . |
| WO94/23506 | 10/1994 | Sweden . |

OTHER PUBLICATIONS

Satyanarayanan, Accessing information on demand at any location mobile information access, IEEE. Feb. 1996.

Primary Examiner—Dwayne D. Bost
Assistant Examiner—Nay Aung Mavng
Attorney, Agent, or Firm—Jenkins & Gilchrist, P.C.

[57] ABSTRACT

A mobile switching center including multiple home location register platforms presented in varying configurations and connected to a network through a set of signal transfer points. In a master/slave configuration, a master platform is given primary responsibility for handling network service request messages, and dynamic data affecting messages are copied to a slave platform in order to maintain data integrity therein in the event the master fails and the slave must take over for the master. In a load sharing configuration, each platform is given primary responsibility for handling network service request messages of its "own" subscribers, and dynamic data affecting messages are copied between the platforms in order to maintain data integrity therein in the event one of the platforms fails and the remaining functional platforms must take over for the failed platform in addition to serving its own subscribers. The signal transfer points function to automatically and transparently route service requests to the platforms for handling in accordance with the configurations and platform operating status. The disclosed platform configurations are applicable to data base systems in particular and, in general, to any node of a data communications system.

40 Claims, 5 Drawing Sheets

HARDWARE AND DATA REDUNDANT ARCHITECTURE FOR NODES IN A COMMUNICATIONS SYSTEM

BACKGROUND OF THE INVENTION

1. Technical Field of the Invention

The present invention relates to communications systems and, in particular, to an architecture for providing both hardware and data redundancy to individual nodes in a communications system. The present invention is particularly applicable to providing such redundancy for system nodes utilizing data bases, for example, mobile telephone network home or visitor location registers.

2. Description of Related Art

The mobile switching center of a mobile telephone network includes a plurality of data bases which are consulted by the center during the establishment of a telephone connection within the mobile telephone network. These data bases include a home location register and a visitor location register which comprise platforms for storing in a data base format both static (i.e., non-changing) and dynamic (i.e., changing) data related to the subscribers.

The static data stored in the registers includes, for example, a list of identifiers for cooperating exchanges interconnected with the mobile switching center, an identification of the services (like transfer on busy) permitted for use by each subscriber, and the parameters associated with such services (like a fixed C number). The foregoing examples of data, as well as other types of static data, are entered into the data base and may be modified only by the administrator for the registers. The dynamic data on the other hand includes, for example, subscriber defined service data (like a variable C number), mobile station location data (with respect to both the mobile switching center and the base station), and mobile station activity data (like mobile station on/off status). This data, as well as other types of dynamic data, are entered into the data base and may be modified at any time by the subscriber, by the mobile station, or by the network in a manner that is transparent to the subscriber.

Because the home location register contains the data needed to establish a telephone connection within the mobile telephone network, the failure of the platform for the home location register will deprive a substantial number of subscribers of the capability of receiving or originating a telephone call. It is further important to remember that it is not only the platform, but also the static and dynamic data stored thereon, that are critical to the establishment of the telephone connection. Accordingly, there is a need for a system capable of handling a home location register platform failure from not only the hardware point of view, but also with respect to maintaining the integrity of the static and dynamic data stored thereon. Such a system will have applications in any data base system or communications system node wherein redundancy is required.

SUMMARY OF THE INVENTION

An architecture is presented for providing hardware and data redundancy to individual nodes in a data communications system, along with a method for redundant data handling communications by the individual nodes. The method further provides for the restoration of accurate data following a node failure. This architecture utilizes multiple platforms in each node of the data communications system, with the multiple platforms being presented in varying configurations.

In one embodiment of the present invention, the multiple platforms are paired in a master/slave relationship and connected to a network. All network users are redundantly connected for communications to both platforms through signal routers that render the existence of the multiple platforms transparent to the network. The master platform is given the primary responsibility for handling (i.e., processing and responding to) data communications. Thus, all data communications are routed by the signal routers to the master platform. The slave platform is copied to by the master platform with the communications that when processed result in the modification of data stored in the master platform. Copying of such communications to the slave platform maintains data integrity across the data communications system and gives the slave platform the information necessary to take over processing tasks from the master platform in the event of a failure. When a master platform failure occurs and is detected, the signal routers automatically and transparently route data communications to the slave platform instead of to the master platform for handling.

In another embodiment of the present invention, each one of a number of included platforms is assigned responsibility for only a portion of the total user population. Thus, the multiple platforms share processing load responsibilities for the overall user load. At the same time, however, all network users are redundantly connected for communications through the signal routers to each of the platforms. The data communications that when processed result in the modification of data stored in a platform are copied between the platforms. Copying of such communications between platforms maintains data integrity across the data communications system and gives each platform access to the information necessary to take over processing tasks from another platform in the event of a platform failure. When a platform failure occurs and is detected, the signal routers automatically and transparently route data communications instead to one of the remaining functional platforms for handling.

The system and method of the present invention are especially useful in providing hardware and data redundancy for the data bases comprising the location registers (home or visitor) maintained in the mobile switching center of a mobile telephone system. It is in connection with this particular application that the preferred embodiments of the present invention will be described. However, as the system and method of the present invention are applicable to any node in a data communications system and/or to any data base system wherein redundancy as to both hardware and data is needed or useful, it will be understood that the description of present invention in the context of redundant home location registers provided herein is by way of explanation of the invention rather than of limitation of the scope of the invention.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF EMBODIMENTS

Figure 1:
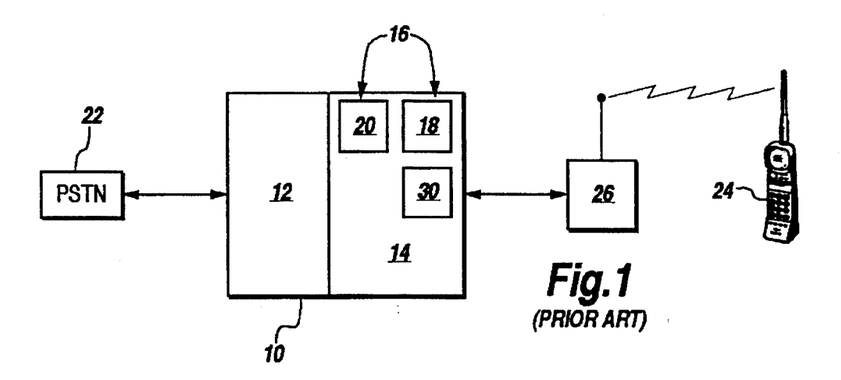
FIG. 1 is a block diagram of a conventional mobile switching center including a home location register.

Referring now to FIG. 1, there is shown a block diagram of a conventional mobile switching center 10 comprising an exchange 12 and a mobile telephony subsystem 14. The mobile telephony subsystem 14 includes a plurality of data bases 16 for storing both static (i.e., non-changing) and dynamic (i.e., changing) data related to the subscribers of the mobile telephone system. These data bases comprise a home location register 18 and a visitor location register 20 that are consulted by the center during the establishment of a telephone connection within the mobile telephone network and through a base station 26 to a subscriber mobile station 24. The exchange 12 is further connected to the public switched telephone network 22. The home location register 18 and visitor location register 20 also process service request messages from the components of the telephone system. Examples of commonly responded to service request messages are: Registration-Notification; Registration-Cancellation; and Service-Profile-Request.

The static data stored in the data bases 16 includes, for example, a list of identifiers for cooperating exchanges interconnected with the mobile switching center 10, an identification of the services (like transfer on busy) permitted for use by each subscriber, and the parameters associated with such services (like a fixed C number). This data, as well as other types of static data known to those skilled in the art, is entered into the data bases 16 and may be modified only by a data base administrator 28 provided within the mobile switching center 10. The dynamic data, on the other hand, includes, for example, subscriber defined service data (like a variable C number), mobile station 24 location data (with respect to both the mobile switching center 10 and the base station 26), and mobile station activity data (like mobile station on/off status). This data, as well as other types of dynamic data known to those skilled in the art, is entered into the data bases 16 and may be modified at any time by the subscriber, by the mobile station 24, or by the network 22 in a manner transparent to (i.e., without the knowledge or participation of) the subscriber.

The mobile telephony subsystem 14 further includes an authentication center 30 that provides authentication parameters for preventing subscribers from falsely assuming the identity of another subscriber, and encryption parameters for encrypting transmitted information when necessary. Further detailed description of the functional operation and configuration of the conventional mobile switching center 10 or its component parts is deemed unnecessary as such information is well known to those skilled in the art.

Figure 2:
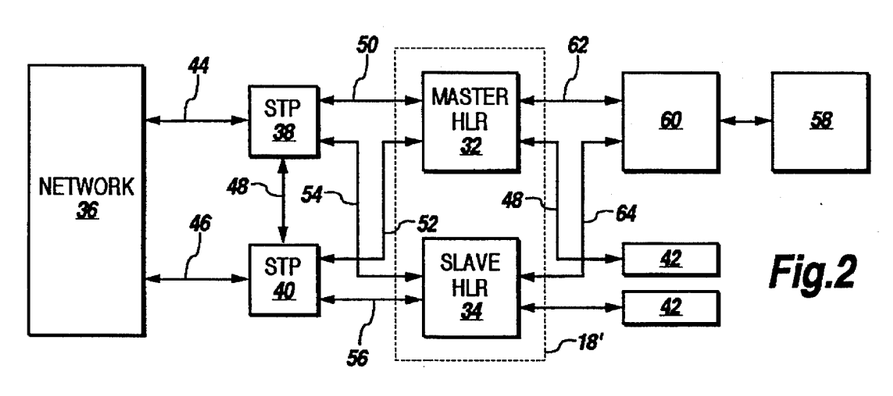
FIG. 2 is a block diagram of a first embodiment of the present invention comprising redundant home location register platforms presented in a master/slave configuration.

Referring now to FIG. 2, there is shown a block diagram of a first embodiment of the present invention wherein the mobile switching center includes redundant home location register (HLR) platforms 18' comprising a master home location register platform 32 and a slave home location register platform 34. The home location register platforms 32 and 34 include alarms 42 and interface with the network 36 of the mobile switching center through a pair of signal transfer points (STPs) 38 and 40. It should be recognized that the signal transfer points 38 and 40 render the existence of multiple home location register platforms 32 and 34 transparent to the network 36. By "transparent" it is meant that the network 36 is unaware of either the existence of multiple home location register platforms 32 or 34 or of which platform is responding to network service request messages.

The network 36 is connected to the first signal transfer point 38 via communications link 44, and is connected to the second signal transfer point 40 via communications link 46. Another communications link 48 is provided between the first and second signal transfer points 38 and 40. The master home location register platform 32 is connected to the first signal transfer point 38 via communications link 50, and is connected to the second signal transfer point 40 via communications link 52. Similarly, the slave home location register platform 34 is connected to the first signal transfer point 38 via communications link 54, and is connected to the second signal transfer point 40 via communications link 56. The master home location register platform 32 and the slave home location register platform 34 are further connected to a home location register administrator 58 through an interface 60 and a pair of communications links 62 and 64. The interface 60 facilitates concurrent administrator 58 communications access to both the master and slave home location register platforms 32 and 34. Although shown as single links, the communications links shown in FIG. 2 may comprise multiple parallel links as necessary.

The master home location register platform 32 is given the primary responsibility for handling (i.e., processing and responding to) network communications service request messages. In operation of the system, as will be described in more detail herein, all service request messages are routed by the signal transfer points 38 and 40 to the master home location register platform 32. The slave home location register platform 34 is copied to by the master home location register platform 32 using the signal transfer points 38 or 40 with relevant messages in order to maintain dynamic data integrity and give the slave platform access to the information necessary to take over from the master platform in the event of a platform failure.

Figure 3:
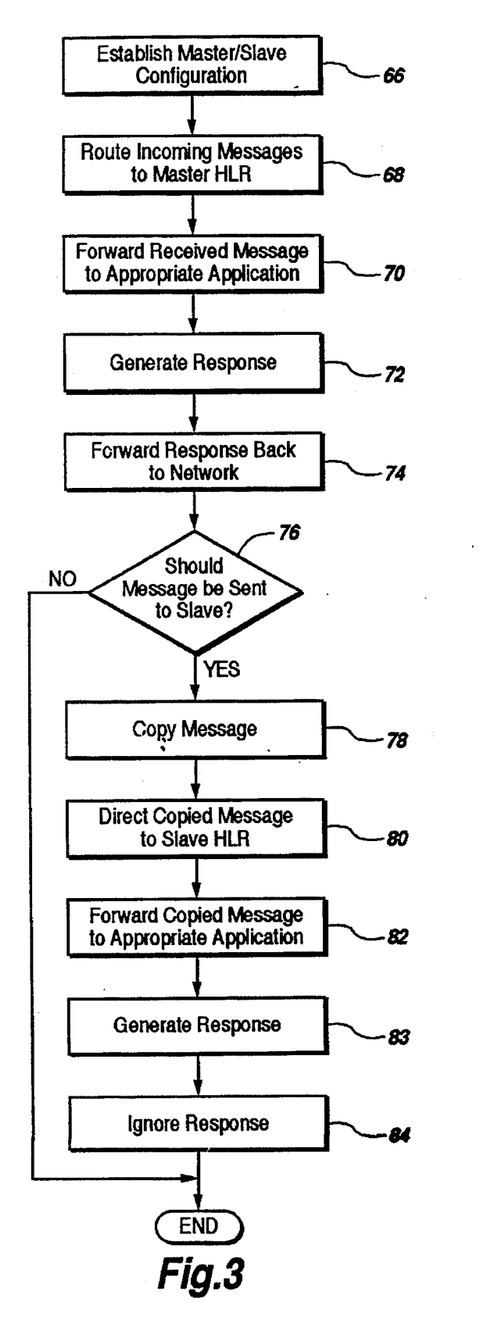
FIG. 3 is a flow diagram illustrating the processing steps for handling received service request messages in the system of FIG. 2.

Reference is now made to FIGS. 2 and 3, wherein FIG. 3 is a flow diagram illustrating the processing steps for handling received service request messages by the master and slave home location register platforms 32 and 34, respectively, in the system of FIG. 2. Each service request message includes a direct point code identifying the home location register platform 32 or 34 designated for handling the message. In the master/slave configuration of FIG. 2, the master home location register platform 32 preferably handles all messages unless it is determined that the master platform is not serving the network 36 (i.e., there is a platform failure). Accordingly, in step 66, the network administrator 58 configures the home location register platforms 32 and 34 in a master/slave configuration by designating the master home location register platform 32 to serve all network service request messages.

In response to the receipt of a message from the network 36, the signal transfer points 38 and 40 then route the message via alternate routing paths only to the master home location register platform 32 (step 68). For example, when the first signal transfer point 38 receives the message over link 44, it first attempts to route the message over communications link 50. If this fails, the first signal transfer point 38 passes the message to the second signal transfer point 40 via link 48 for transmission to the master home location register platform 32 over communications link 52. Two paths are similarly provided to the master home location register platform 32 from the second signal transfer point 40 (link 52 or links 48 and 50) for carrying messages received over link 46. Thus, redundant/alternate communications paths are provided from the signal transfer points 38 and 40 for carrying messages to the master home location register platform 32. This data link redundancy provides alternative message paths and addresses concerns over potential communications link failures that would otherwise prevent the network 36 from accessing an operating master home location register platform 32.

Upon receipt of the message, the master home location register platform 32 forwards the message to the appropriate application for processing (step 70). The application processes the message and generates an appropriate response (step 72). This response is then forwarded by the master home location register platform 32 back to the network 36 via the signal transfer points 38 or 40 (step 74).

The master home location register platform 32 further makes a determination as to whether the received message should also be sent to the slave home location register platform 34 (step 76). This decision is made based on whether the processing of the message in the application will result in a modification of the stored dynamic data. If a modification in the stored dynamic data will occur, the master home location register platform 32 copies the message (step 78) and directs the copied message back through the signal transfer points 38 or 40 in accordance with routing instructions to the slave home location register platform 34 (step 80). The slave home location register platform 34 then responds like the master register platform by forwarding the message to the appropriate application (step 82) resulting in a modification of the dynamic data stored therein and the generation of a response (step 83). In this case, however, the generated response is ignored (step 84) by the slave platform and not sent to the network 36 because the slave home location register platform 34 has not been designated by the administrator 58 to service network requests.

Following processing of the received message in accordance with the steps described above, both home location register platforms 32 and 34 include the same stored dynamic data. In the event the master home location register platform 32 should thereafter fail, the slave home location register platform 34 possesses all the dynamic data necessary to transparently take over responding to network service requests.

Figure 4:
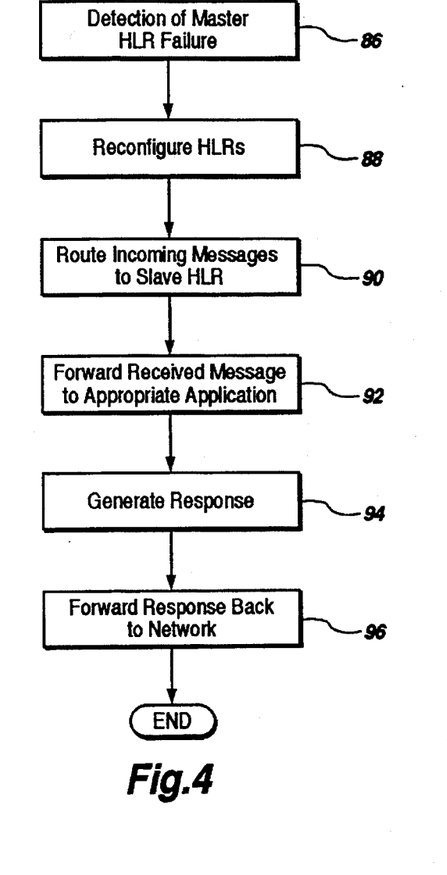
FIG. 4 is a flow diagram illustrating the processing steps for handling a master home location register platform failure and any service request messages received thereafter in the system of FIG. 2.

Reference is now made to FIGS. 2 and 4, wherein FIG. 4 is a flow diagram illustrating the processing steps for handling the failure of a master home location register platform 32, and for the handling by the slave home location register platform 34 of any service requests received thereafter. Following detection of a failure of the master home location register platform 32 by either or both the administrator 58 or the signal transfer points 38 and 40 (step 86), the administrator reconfigures the home location register platforms 32 and 34 by now designating the slave home location register platform 34 to serve all network requests (step 88).

In response to the receipt of a message from the network 36, the signal transfer points 38 and 40 automatically and transparently route the message to the slave home location register platform 32 (step 90). In this connection, "transparently" again means that the network 36 is unaware of either the existence of multiple home location register platforms 32 or 34 or of which platform is responding to the message. Upon receipt of the message, the slave home location register platform 34 forwards the message to the appropriate application (step 92). The application then generates a response (step 94), and the response is forwarded back to the network 36 via the signal transfer points 38 and 40 (step 96).

With respect to the handling of a received message by the signal transfer points 38 and 40 after a failure of the master home location register platform 32, if the first signal transfer point 38 receives the message over link 44, it first attempts to route the message over communications link 54. If this fails, the first signal transfer point 38 passes the message to the second signal transfer point 40 via link 48 for transmission to the slave home location register platform 34 over communications link 56. Two paths are similarly provided to the slave home location register platform 34 from the second signal transfer point 40 (link 56 or links 48 and 54) for carrying messages received over link 46. Thus, redundant/ alternate communications paths are provided from the signal transfer points 38 and 40 for carrying messages to the slave home location register platform 34 following master platform failure. This data link redundancy provides alternate message paths and addresses concerns over potential communications link failures that would otherwise prevent the network 36 from accessing an operating slave home location register platform 34.

It is possible for messages to be received from the network 36 and transmitted automatically by the signal transfer points 38 and 40 to the slave home location register platform 34 (following master platform failure) before the administrator 58 has had a chance to reconfigure the system. In that case, the messages are discarded by the slave home location register platform 34 upon receipt because the slave platform has not yet been designated to handle network service requests. These discarded messages must be retransmitted by the network 36. Discovery of the discarded messages is generally made when the designated time-out for the message expires without network reception of a response from the home location register.

Figure 5A:
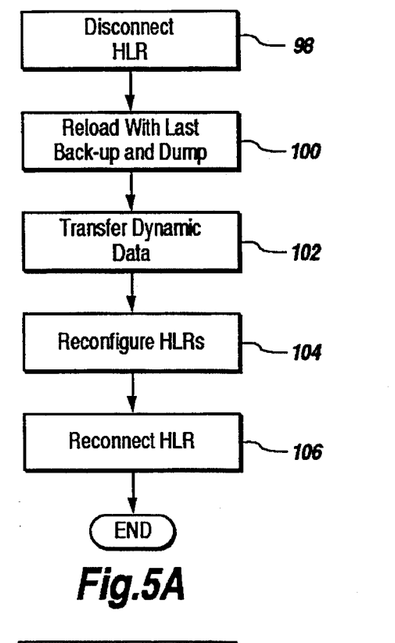
FIGS. 5A and 5B are flow diagrams illustrating the processing steps of two methods for restoring subscriber data in a failed home location register platform in the system of FIG. 2.

Reference is now made to FIGS. 2 and 5A, wherein FIG. 5A is a flow diagram illustrating the processing steps of one method for restoring accurate and up-to-date subscriber data in the failed master home location register platform 32 in the system of FIG. 2. The subscriber data that is updated in the master home location register platform 32 comprises primarily the dynamic data which was affected by the interim handling of service requests by the slave home location register platform 34.

The master home location register platform 32 is first disconnected from the signal transfer points 38 and 40 (step 98). The master home location register platform 32 is then reloaded with its last back-up and subscriber data dump (step 100). Next, dynamic data is transferred from the slave home location register platform 34 to the master home location register platform 32 (step 102) by loading the slave platform's last subscriber data dump into the master platform, dumping the slave platform's dynamic data, and loading the dumped data into the master platform. The administrator 58 then reconfigures the home location register platforms 32 and 34 by again designating the master home location register platform 32 to service all network request messages (step 104). Restoration concludes when the master home location register platform 32 is reconnected to the signal transfer points 38 and 40 (step 106). Preferably, at a time prior to beginning platform handling of network service requests, the master home location register platform 32 propagates an "Unreliable-Roamer-Data-Directive" to acquire and store accurate mobile station 24 locations. A data dump from the master home location register platform 32 may also be performed at this time in case the platform should immediately fail again.

Figure 5B:
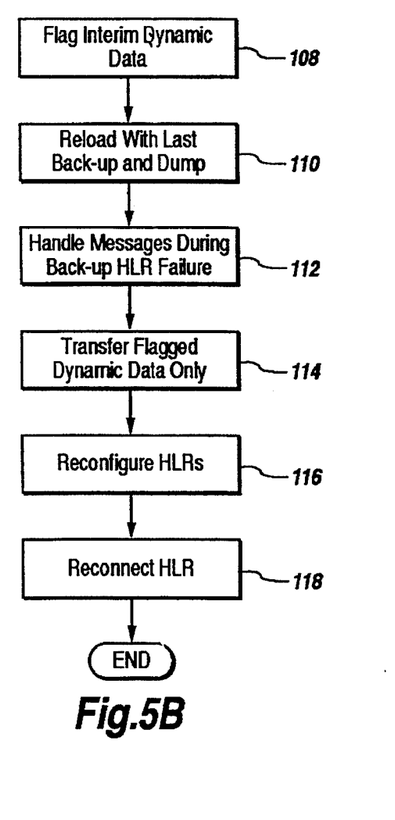

In FIG. 5B, another method for restoring the subscriber data of the failed master home location register platform 32 is shown. This method is particularly applicable to handling situations where the slave home location register platform 34 fails before the restoration of the master platform 32 is completed. In accordance with this method, when the slave home location register platform 34 takes over for a failed master home location register platform 32, all dynamic data in the slave platform modified by the processing of a network service request during the interim period is marked (flagged) as new data (step 108). When the master home location register platform 32 is brought back on-line, the master platform is reloaded with its last back-up and subscriber data dump (step 110). If the slave platform 34 then fails prior to restoration of dynamic data, the master platform 32 handles service request messages as best as possible (step 112). When the slave platform 34 is brought back on-line, only the marked dynamic data is transferred from the slave home location register platform 34 to the master home location register platform 32 (step 114) by dumping the slave platform's marked dynamic data, and loading the marked data into the master platform. The administrator 58 then reconfigures the home location register platforms 32 and 34 by designating that the master home location register platform 32 serves network requests (step 116). Restoration concludes when the master home location register platform 32 is reconnected to the signal transfer points 38 and 40 (step 118) and begins handling network service requests.

Failure of the slave home location register platform 34 while the master home location register platform 32 is in operation does not present a critical problem since processing of service request messages continues without interruption. The master home location register platform 32, however, then operates without any back-up. The procedures of FIGS. 5A and 5B are also used to handle the restoration of the slave home location register platform 34 subscriber data from the master home location register platform 32 subscriber data when the slave platform returns on-line.

Figure 6:
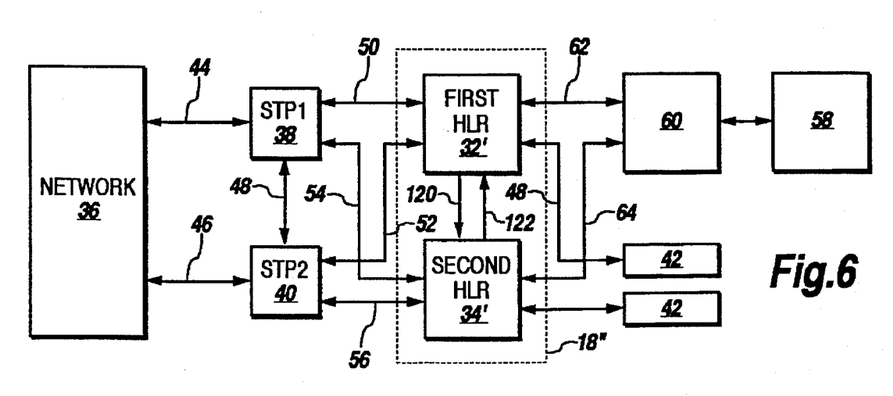
FIG. 6 is a block diagram of a second embodiment of the present invention comprising redundant home location register platforms presented in a load sharing configuration.

Referring now to FIG. 6, there is shown a block diagram of a second embodiment of the present invention wherein the mobile switching center includes redundant home location register platforms 18" comprising a first home location register platform 32' and a second home location register platform 34' in a load sharing configuration as will be described in more detail herein. In FIG. 6, identical reference numerals refer to like or similar components as shown in the system of FIG. 2. The home location register platforms 32' and 34' include alarms 42 and interface with the network 36 of the mobile switching center through a pair of signal transfer points 38 and 40. Thus, even though they are normally serviced by only a designated one of the platforms 32' or 34', all subscribers are connected to both platforms through the signal transfer points 38 and 40. In this connection, it should be recognized that the signal transfer points 38 and 40 render the existence of multiple home location register platforms 32' and 34' transparent to the network 36. By "transparent" it is meant that the network 36 is unaware of either the existence of multiple home location register platforms 32' or 34' or of which platform is responding to network service request messages.

The network 36 is connected to the first signal transfer point (STP1) 38 via communications link 44, and is connected to the second signal transfer point (STP2) 40 via communications link 46. Another communications link 48 is provided between the first and second signal transfer points 38 and 40. The first home location register platform 32' is connected to the first signal transfer point 38 via communications link 50, and is connected to the second signal transfer point 40 via communications link 52. Similarly, the second home location register platform 34' is connected to the first signal transfer point 38 via communications link 54, and is connected to the second signal transfer point 40 via communications link 56. The first home location register platform 32' and the second home location register platform 34' are further connected to a home location register administrator 58 through an interface 60 and a pair of communications links 62 and 64. The interface 60 facilitates concurrent administrator 58 communications access to both the home location register platforms 32' and 34'. A pair of communications links 120 and 122 connect between the first and second home location register platforms 32' and 34'. Although shown as single links, the communications links shown in FIG. 6 may comprise multiple links as necessary.

The first and second home location register platforms 32' and 34' are each given the responsibility for handling (i.e., processing and responding to) network communications service requests for only a portion of the total subscriber population (commonly referred to as "own subscribers") serviced by the mobile telephone network. In this connection, it should be noted that the number of own subscribers assigned to each home location register platform in this embodiment could be limited to approximately one-half of platform processor load capacity in case the platform processor is required to assume processing responsibilities for the own subscribers of a failed platform. Limitation of loading in this manner helps prevent overloading of a single platform in the event another platform fails.

In operation of the system, as will be described in more detail herein, all service requests are routed by the signal transfer points 38 and 40 to the appropriate one of the first and second home location register platforms 32' and 34' designated to handle the request. Thus, the multiple home location register platforms share processing load responsibilities for the overall subscriber load of network service requests. The home location register platforms 32' and 34' further copy relevant messages between each other in order to maintain dynamic data integrity and give each platform access to the information necessary to take over from another platform in the event of a platform failure.

Figure 7:
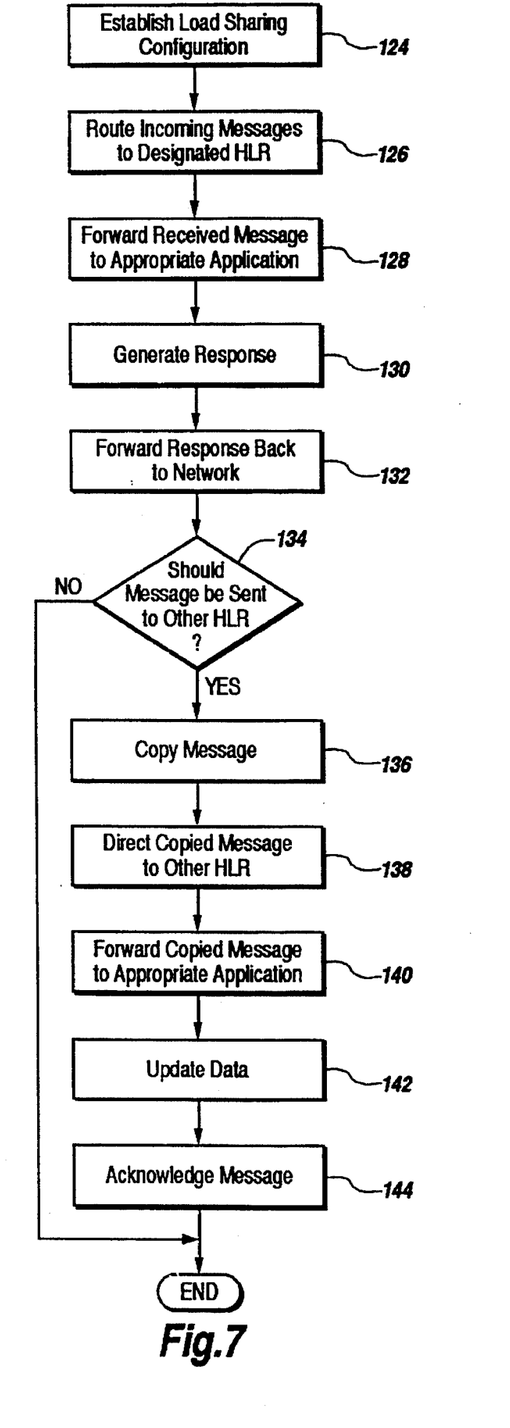
FIG. 7 is a flow diagram illustrating the processing steps for handling received service request messages in the system of FIG. 6.

Reference is now made to FIGS. 6 and 7, wherein FIG. 7 is a flow diagram illustrating the processing steps for handling received service requests by the home location register platforms 32' and 34' in the system of FIG. 6. Each service request message includes a direct point code identifying the home location register platform 32' or 34' designated for handling the message. In the shared load configuration of FIG. 6, the home location register platform 32' or 34' handles all messages of its own subscribers and/or as designated by the direct point code unless it is determined that the designated platform is not serving the network 36 (i.e., there is a platform failure). Accordingly, in step 124, the network administrator 58 configures the home location register platforms 32' and 34' in a load sharing configuration by designating that each home location register platform serve only the network service request messages of its own subscribers.

In response to the receipt of a message from the network 36, the signal transfer points 38 and 40 route the message to the home location register platform 32' or 34' designated by the direct point code of the message (step 126). For example, for a service request received over link 44 having a direct point code designating the first home location register platform 32', the first signal transfer point 38 first attempts to route the message over communications link 50. If this fails, the first signal transfer point 38 passes the message to the second signal transfer point 40 via link 48 for transmission to the first home location register platform 32' over communications link 52. If the direct point code designates the second home location register platform 34', the message is routed over link 54 first, and, if that fails, then over links 48 and 56. A similar routing procedure is followed for messages received over link 46. As shown, two alternate paths are provided to each home location register platform 32' or 34' from each of the signal transfer points 38 and 40, respectively, for carrying messages received from the network 36. This data link redundancy provides alternate data paths and addresses concerns over potential communications link failures that would otherwise prevent access to an operating home location register platform 32' or 34'.

Upon receipt of the message, the designated home location register platform 32' or 34' forwards the message to the appropriate application (step 128). The application processes the message and generates an appropriate response (step 130). This response is forwarded by the home location register platform back to the network 36 via the signal transfer points 38 and 40 (step 132).

The designated home location register platform 32' or 34' further makes a determination as to whether the received message should also be sent to the other home location register platform (step 134). This decision is made based on whether the processing of the message in the application will result in a modification of the stored dynamic data. If a modification in the stored dynamic data will occur, the designated home location register platform 32' or 34' copies the message (step 136) and directs the copied message over communications links 120 or 122 to the other home location register platform (step 138). The other home location register platform 32' or 34' then responds to the message by processing the message in the application (step 140), updating the dynamic data (step 142) and confirming message receipt with an acknowledgement sent to the designated home location register platform via communications links 120 or 122 (step 144).

Following processing of the received message in accordance with the steps described above, both home location register platforms 32' and 34' include the same stored dynamic data. In the event one of the home location register platform should thereafter fail, the other platform possesses all the dynamic data necessary to transparently take over responding to the network service requests designated by the direct point code for that failed platform.

Figure 8:
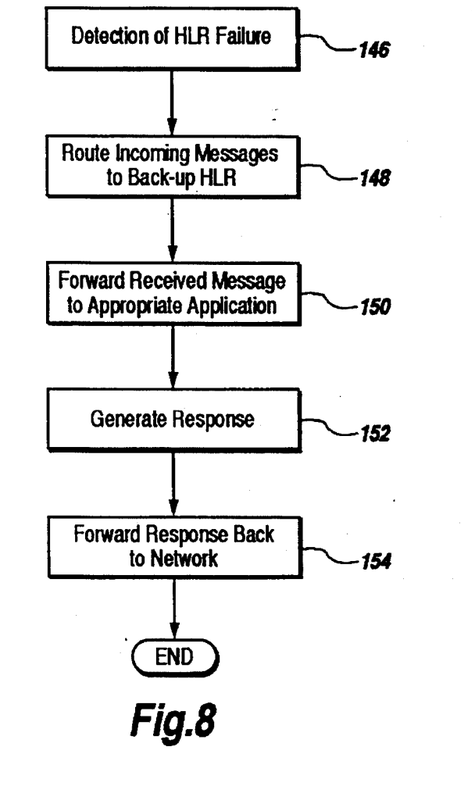
FIG. 8 is a flow diagram illustrating the processing steps for handling a home location register platform failure and any service request messages received thereafter in the system of FIG. 6.

Reference is now made to FIGS. 6 and 8, wherein FIG. 8 is a flow diagram illustrating the processing steps for handling the failure of one of the home location register platforms 32' or 34', and for the handling by the other home location register platform of any service requests received thereafter. Following detection of a failure of one of the home location register platforms 32' or 34' by either or both the administrator 58 or signal transfer points 38 and 40 (step 146), all incoming service request messages designated by their direct point codes for the failed platform are automatically and transparently rerouted by the signal transfer points 38 and 40 to the other (back-up) platform for servicing (step 148). In this connection, "transparently" again means that the network 36 is unaware of the existence of multiple home location register platforms 32' and 34' or of which platform is responding to the message. Upon receipt of the message, the other home location register platform 32' or 34' forwards the message to the appropriate application (step 150). The application then generates a response (step 152) that is forwarded back to the network 36 via the signal transfer points 38 and 40 (step 154).

With respect to the handling of a received message by the signal transfer points 38 and 40 after a platform failure, for example, if the first signal transfer point 38 receives a message designated for the failed first home location register platform 32', the first signal transfer point 38 first attempts to route the message over communications link 54. If this fails, the first signal transfer point 38 passes the message to the second signal transfer point 40 via link 48 for transmission to the second home location register platform 34' over communications link 56. A similar routing procedure is followed for messages received by the second signal transfer point 40 and/or designated for the second home location register platform 34'. This redundancy in available data links provides alternate data paths and addresses concerns over potential communications link failures that otherwise would prevent access to an operating home location register platform 32' or 34'.

It is possible for messages to be sent by the network 36 prior to platform failure, but not received or handled by the time the designated platform fails. In that case, the messages are not processed by the platform and no response is generated. In order to obtain a response, these messages must be retransmitted by the network 36. Discovery of the need to retransmit is generally made when the designated time-out for the message expires without network reception of a response from the home location register.

Figure 9A:
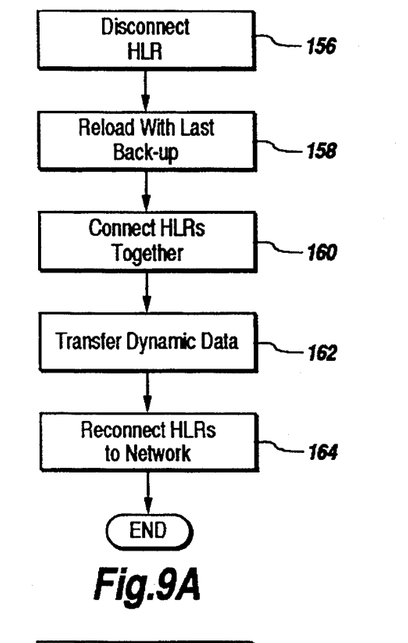
FIGS. 9A and 9B are flow diagrams illustrating the processing steps for restoring subscriber data in a failed home location register platform in the system of FIG. 6.

Reference is now made to FIGS. 6 and 9A, wherein FIG. 9A is a flow diagram illustrating the processing steps of one method for restoring accurate and up-to-date subscriber data in the failed home location register platform 32' or 34' in the system of FIG. 6. This method is advantageously used following a relatively short duration failure of one of the home location register platforms 32' or 34' to update the platform as to the dynamic data affected by the interim handling of service requests by the other home location register platform while operating as a back-up.

The failed home location register platform 32' or 34' is first disconnected from the signal transfer points 38 and 40 and from the other platform (step 156). The failed home location register platform 32' or 34' is then reloaded with its last back-up (step 158). Next, the home location register platforms 32' and 34' are connected to each other (step 160). The back-up home location register platform then transmits to the failed home location register platform all subscriber data which was modified after the start of the last data back-up, with a preference being given to the data of the failed platform's own subscribers (step 162). Restoration concludes when the previously failed, and now up-dated home location register platform 32' or 34' is reconnected to the signal transfer points 38 and 40 (step 164). A data dump from the home location register platform prior to beginning handling network service requests may be performed at this time in case the platform should immediately fail again.

Figure 9B:
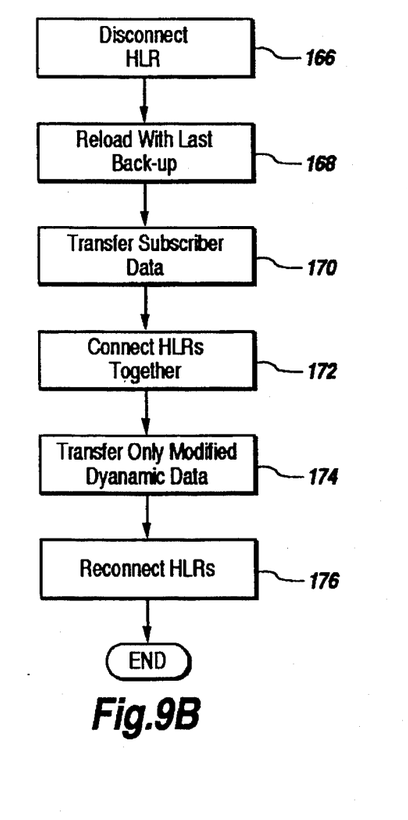

In FIG. 9B, another method for restoring the subscriber data of the failed home location register platform 32' or 34' is shown. This method is advantageously used following a relatively long duration failure of one of the home location register platforms 32' or 34' because such an up-date typically involves transfer of almost all of the data base of the other home location register platform operating as a back-up. The failed home location register platform 32' or 34' is first disconnected from the signal transfer points 38 and 40 and from the other platform (step 166). The failed home location register platform 32' or 34' is then reloaded with its last back-up (step 168). Next, the subscriber data of the other home location register platform is dumped and loaded into the failed home location register platform (step 170). The home location register platforms 32' and 34' are then connected to each other (step 172), and the other home location register platform transmits to the failed home location register platform all dynamic data which was modified after the start of the last back-up, with a preference being given to the data of the failed platform's own subscribers (step 174). Restoration concludes when the previously failed, and now up-dated home location register platform 32' or 34' is reconnected to the signal transfer points 38 and 40 (step 176). Again, a data dump from the previously failed, and now restored home location register platform may be performed prior to handling service request messages.

Figure 10:
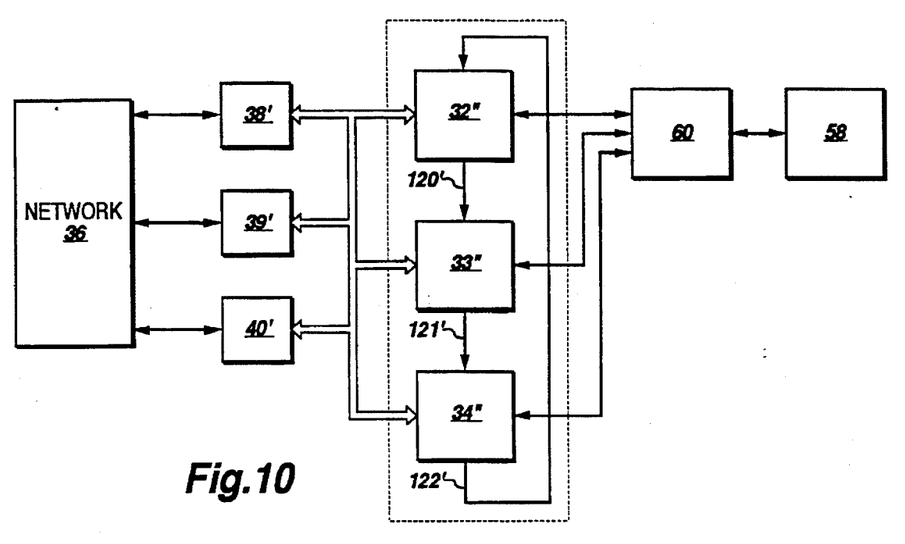
FIG. 10 is a block diagram of a load sharing configuration for linking more than two redundant home location register platforms.

Referring now to FIG. 10, there is shown a block diagram of an alternative configuration of the second embodiment of the present invention for linking more than two redundant home location register platforms 32', 33' and 34' configured in a load sharing relationship. In this FIG. 10, identical reference numerals refer to like or similar components as shown in the system of FIG. 6. With multiple home location register platforms in a load sharing configuration, each platform could be assigned to handle only a portion of the overall subscriber load (approximately one-third in this configuration). An additional signal transfer point 39' is also included for each added home location register platform. To facilitate communications between the included home location register platforms, a circular communications link is provided comprising links 120', 121' and 122'. Operation and restoration of the home location platforms is performed in a manner similar to that illustrated in FIGS. 7–9B for the system of FIG. 6.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions, including use with the visitor location register or with other types of data base systems requiring redundancy of both hardware and data, without departing from the spirit of the invention as set forth and defined by the following claims. In particular, it will be understood that the method and apparatus of the present invention are applicable to any node in a data communications system and/or any data base system wherein redundancy as to both hardware and data is needed or useful. Accordingly, the foregoing description of the present invention in the context of redundant home location registers is by way of explanation of the invention rather than of limitation of the scope of the invention.

What is claimed is:

1. A hardware and data redundant data processing node within a communications network, comprising:

a master node platform for data communications processing;

a slave node platform for back-up data communications processing;

plural signal transfer points redundantly connected between the communications network and both the master and slave node platforms for routing received data communications to the master node platform for processing, and further responding to a detection of a failure of the master node platform by routing said received data communications instead to the slave node platform for processing; and means for forwarding data communications received and processed by the master node platform via the plural signal transfer points also to the slave node platform for processing to conform processed data communications between the slave platform and the master platform.

2. The node as in claim 1 wherein the master and slave node platforms comprise redundant master and slave data bases in the communications network.

3. The node as in claim 2 wherein the master and slave data bases comprise redundant master and slave location registers connected to a mobile switching center for a mobile telephone communication network.

4. The node as in claim 1 further comprising means for restoring the accuracy of the data stored in the failed master node platform through a transfer of the data from the slave node platform to the master node platform via the plural signal transfer points following a master node platform failure.

5. A method for redundant processing of service request communications in a telecommunications network including a master processing node platform and a slave processing node platform that is a redundant back-up to the master processing node platform, said method comprising the steps of:

routing service request communications to the master processing node platform for processing to perform the requested service and result in modification of data stored therein; and forwarding said routed service request communications also to the slave processing node platform for processing therein to perform the requested service and conforming modification of the data stored in the slave processing node platform to match the data stored in the master processing node platform.

6. The method as in claim 5 wherein the master and slave processing node platforms comprise redundant master and slave processing data bases in the telecommunications network.

7. The method as in claim 6 wherein the master and slave processing data bases comprise redundant master and slave location registers in a mobile switching center for a mobile telephone communication system.

8. The method as in claim 5 further comprising the steps of:

monitoring for a failure of the master processing node platform; and responsive to such a failure, automatically routing all subsequent service request communications to the slave processing node platform for processing to perform the requested service, generation of a response to said subsequent service request communications and modification of the data stored within said slave processing node platform.

9. The method as in claim 8 further comprising the steps of:

waiting for the master processing node platform to come back on-line;

transferring data from the slave processing node platform to the master processing node platform to restore accuracy of the data stored in the master processing node platform; and reconfiguring system operation to again route all service request communications to the master processing node platform.

10. A hardware and data redundant data processing node within a communications network, comprising:

a first node platform assigned to process data communications for a first portion of a plurality of users;

a second node platform assigned to process data communications for a second portion of the plurality of users;

plural signal transfer points redundantly connected between the network and both the first and second data base platforms for routing first user data communications to the first node platform and for routing second user data communications to the second node platform, and further responding to a detection of a failure of either of the first or second node platforms by routing the user data communications intended for a failed one of the first or second node platforms instead to an operating one of the first or second node platforms; and means associated with each node platform for forwarding via the plural signal transfer points user data communications received and processed therein by either of the first or second node platforms also to the other of said first or second node platforms for processing to conform data stored in the first and second node platforms.

11. The node as in claim 10 wherein the first and second node platforms are redundant data bases in the data communications network.

12. The node as in claim 10 wherein the first and second node platforms are redundant location registers in a mobile switching center for a mobile telephone communication network.

13. The node as in claim 10 further comprising means for restoring the accuracy of the data stored in the failed one of the node platforms through a transfer of the data via the plural signal transfer points from the operating one of the node platforms to the failed one of the node platforms following a node platform failure.

14. A method for redundant processing of service request communications by a telecommunication network including a first processing node platform assigned to handle first user service request communications and a second processing node platform assigned to handle second user service request communications, said method comprising the steps of:

routing first user service request communications to the first processing node platform for processing to perform the requested service an effectuate a modification of data stored therein;

routing second user service request communications to the second processing node platform for processing to perform the requested service and effectuate a modification of data stored therein; and forwarding said user service request communications routed to one of the processing node platforms also to the other the processing node platforms for processing therein to perform the requested service and to conform data stored in the first and second processing node platforms.

15. The method as in claim 14 wherein the first and second processing node platforms are redundant data bases in the telecommunications network.

16. The method as in claim 14 wherein the first and second processing node platforms are redundant first and second location registers for a mobile telephone communication system.

17. The method as in claim 14 further comprising the steps of:

monitoring for a failure of either of the first or second processing node platforms; and responsive to such a failure, automatically routing all subsequent user service request communications for a failed one of the first or second processing node platforms instead to an operating one of the first or second processing node platforms for processing.

18. The method as in claim 17 further comprising the steps of:

waiting for the failed one of the processing node platforms to come back on-line;

transferring data from the operating processing node platform to the failed processing node platform to restore accuracy of the data stored in the failed processing node platform; and reconfiguring routing of user service request communications.

19. A data base system providing hardware and data redundancy, comprising:

a master data base platform for storing data and processing user service messages;

a slave data base platform for back-up data storage and processing of user service messages;

plural signal transfer points redundantly connected between a communications network and both the master and slave data base platforms for routing received user service messages from the network to the master data base platform, and further responding to a detection of a failure of the master data base platform by routing said received user service messages from the network instead to the slave data base platform; and means associated with the master data base platform for forwarding user service messages received and processed by the master data base platform also to the slave data base platform for processing to update data stored therein if processing of the messages in the master data base platform results in the modification of data stored in the master platform.

20. The data base system as in claim 19 further comprising means for restoring the accuracy of the data stored in the failed master data base platform through a transfer of the data from the slave data base platform to the master data base platform following a master data base platform failure.

21. A method for redundant processing of user service requested messages in a telecommunications system including a master data base platform and a slave data base platform that is a redundant back-up to the master data base platform, said method comprising the steps of:

routing user service request messages to the master data base platform for processing to perform the requested service, possibly effectuate a modification of data stored therein and generate a response;

determining whether said routed user service request messages have, as a result of processing by the master data base platform to perform the requested service, effectuated a modification of data stored in the master data base platform; and responsive to an affirmative determination of modification, forwarding said routed user service request messages also to the slave data base platform for processing therein to perform the requested service and effectuate a conforming modification of the data stored in the slave data base platform to match the data stored in the master data base platform.

22. The method as in claim 21 further comprising the steps of:

monitoring for a failure of the master data base platform; and responsive to such a failure, automatically routing all subsequent user service request messages to the slave data base platform for processing to perform the requested service, generation of a response to said subsequent user service request messages and modification of the data stored within said slave data base platform.

23. The method as in claim 22 further comprising the steps of:

waiting for the master data base platform to come back on-line;

transferring data from the slave data base platform to the master data base platform to restore accuracy of the data stored in the master data base platform; and reconfiguring system operation to again route all user service request messages to the master data base platform.

24. The method as in claim 22 further comprising the steps of:

flagging all data modified by the slave data base platform in processing of user service request messages following failure of the master data base platform;

waiting for the master data base platform to come back on-line;

transferring flagged data from the slave data base platform to the master data base platform to restore accuracy of the data stored in the master data base platform; and reconfiguring system operation to again route all user service request messages to the master data base platform.

25. A data base system providing redundant hardware and data protection, comprising:

a first data base platform assigned to process user service messages and to store user data;

a second data base platform assigned to process user service messages and to store user data;

plural signal transfer points redundantly connected between a communications network and both the first and second data base platforms for routing user service messages having a first destination code to the first data base platform and for routing user service messages having a second destination code to the second data base platform, and further responding to a detection of a failure of either of the first or second data base platforms by routing the user service messages having a destination code identifying a failed one of the first or second data base platforms instead to an operating one of the first or second data base platforms; and means associated with the data base platforms for forwarding user service messages received and processed by either of the first or second data base platforms also to the other of said first or second data base platforms for processing to update data stored therein if processing of the messages in the data base platform designated by the destination code results in the modification of the data stored in the designated platform.

26. The data base system as in claim 25 further comprising means for restoring the accuracy of the data stored in the failed one of the data base platforms through a transfer of the data from the operating one of the data base platforms to the failed one of the data base platforms following a data base platform failure.

27. The data base system as in claim 25 further comprising a communications link connecting the first and second data base platforms for carrying user service messages and stored data therebetween.

28. A method for processing user service request messages in a telecommunications system including a first data base platform and a second data base platform, said method comprising the steps of:

routing user service request messages having a first destination code to the first data base platform for processing to perform the requested service and possibly effectuate a modification of data stored there;

routing user service request messages having a second destination code to the second data base platform for processing to perform the requested service and possibly effectuate a modification of data stored therein;

determining whether said routed user service request messages has, as a result of processing by one of the first or second data base platforms to perform the requested service, effectuated a modification of data stored therein; and responsive to an affirmative determination of modification, forwarding said routed user service request messages also to the other one of the data base platforms for processing therein to perform the requested service and to conform stored data in the other data base platform.

29. The method as in claim 28 further comprising the steps of:

monitoring for a failure of either of the first or second data base platforms; and responsive to such a failure, automatically routing all subsequent user service requested messages having a destination code identifying a failed one of the first or second data base platforms instead to an operating one of the first or second data base platforms for processing to perform the requested service and modification of the data stored therein.

30. The method as in claim 29 further comprising the steps of:

waiting for the failed one of the first or second data base platforms to come back on-line;

transferring data from the operating data base platform to the failed data base platform to restore accuracy of the data stored in the failed data base platform; and reconfiguring system operation to again route all user service request messages to the data base platform designated by the destination code.

31. The method as in claim 29 further comprising the steps of:

waiting for the failed one of the first or second data base platforms to come back on-line;

transferring data since data base platform failure from the operating data base platform to the failed data base platform to restore accuracy of the data stored in the failed data base platform; and reconfiguring system operation to again route all user service request messages to the data base platform designated by the destination code.

32. A mobile telephone network home location register system providing hardware and data redundancy, comprising:

a master home location register for storing subscriber data and processing received service request messages to perform a requested service and possibly modify the stored subscriber data;

a slave home location register for back-up storage of subscriber data and processing of received service request messages to perform a requested service and possibly modify the stored back-up subscriber data;

plural signal transfer points connected between the mobile telephone network and both the master and slave home location registers for routing service request messages to the master home location register, and further responding to a detection of a failure of the master home location register by routing said service request messages instead to the slave home location register; and means associated with the master home location register for forwarding service request messages received and processed by the master home location register also to the slave home location register via at lease one of the plural signal transfer points for processing to perform the requested service and to update the back-up subscriber data stored therein if processing of the messages in the master home location register results in the modification of subscriber data stored in the master home location register.

33. The system as in claim 32 further comprising means for restoring the accuracy of the subscriber data stored in the failed master home location register following register failure through a transfer of the subscriber data from the slave home location to the master home location register.

34. The data base system as in claim 32 wherein the plural signal transfer points includes:

a first signal transfer point associated with the master home location register and connected to the mobile telephone network;

a communications link connecting between the first and second signal transfer points; and communications links redundantly connecting between the signal transfer points and the home location registers.

35. A mobile telephone network home location register system providing redundant hardware and data protection, comprising:

a first home location register assigned to store subscriber data for all subscribers and to process received service request messages for a first portion of a plurality of subscribers in performing a requested service and possibly modifying the stored subscriber data associated with the first portion of subscribers;

a second home location register assigned to store subscriber data for all subscribers and to process received service request messages for a second portion of the plurality of subscribers in performing a requested service and possibly modifying the stored subscriber data associated with the second portion of subscribers;

plural signal transfer points connected between the mobile telephone network and both the first and second home location registers for routing service request messages having a first destination code to the first home location register and for routing service request messages having a second destination code to the second home location register, and further responding to a detection of a failure of either of the first or second home location register by routing the service request messages having a destination code identifying a failed one of the first or second home location registers instead to an operating one of the first or second home location registers; and means associated with the registers for forwarding service request messages received and processed by either the first or second home location registers also to the other of said first or second home location registers for processing to perform the requested service and to update subscriber data stored therein if processing of the service request messages in the home location register designated by the destination code results in the modification of the subscriber data stored in the designated home location register.

36. The system as in claim 35 further comprising means for restoring the accuracy of the data stored in the failed one of the home location registers through a transfer of the subscriber data from the operating one of the registers to the failed one of the registers following a register failure.

37. The system as in claim 35 further comprising a communications link connecting the first and second home location registers for carrying service request messages and stored subscriber data therebetween.

38. The system as in claim 35 wherein the plural signal transfer points includes:

a first signal transfer point associated with the first home location register and connected to the mobile telephone network;

a second signal transfer point associated with the second home location register and connected to the mobile telephone network;

a communications link connecting between the first and second signal transfer points; and communications links redundantly connecting between the signal transfer points and the home location registers.

39. A method for operating a mobile telephone switching center home location register system including a master home location register platform and a slave home location register platform that is a back-up to the master home location register platform, said method comprising the steps of:

routing service request messages to the master home location register platform for processing to perform a requested service and possibly modify stored subscriber data;

copying to the slave home location register platform those service request messages that when processed result in a modification of subscriber data stored in the master home location register platform;

processing the copied messages in the slave home location register to perform the requested service and to conform the subscriber data stored in the master and slave home location register platforms;

monitoring for a failure of the master home location register platform; and responsive to such a failure, automatically routing subsequent service request messages to the slave home location register platform for processing and modification of the subscriber data stored therein.

40. A method for operating a mobile telephone switching center home location register system including a first location register platform that is own to a first portion of a plurality of subscribers and a second location register platform that is own to a second portion of the plurality of subscribers, said method comprising the steps of:

routing service request messages having a first direct point code to the first location register platform for processing to perform a requested service and possibly modify stored first portion subscriber data;

routing service request messages having a second direct point code to the second location register platform for processing to perform a requested service and possibly modify stored second portion subscriber data;

copying between the location register platforms those service request messages that when processed result in a modification of subscriber data stored in the location register platform;

processing the copied messages in the location register platforms to perform the requested service and to conform the first and second portion subscriber data stored in the first and second location register platforms;

monitoring for a failure of either of the first or second location register platforms; and responsive to such a failure, automatically routing subsequent service request messages having a direct point code identifying a failed one of the first or second location register platforms instead to an operating one of the first or second location register platforms for processing and modification of the subscriber data stored therein.

* * * * *

UNITED STATES PATENT AND TRADEMARK OFFICE
CERTIFICATE OF CORRECTION

PATENT NO. : 5,623,532            Page 1 of 2
DATED : Apr. 22, 1997
INVENTOR(S) : Houde et al.

It is certified that error appears in the above-identified patent and that said Letters Patent is hereby corrected as shown below:

Column 13, line 53      Replace "telecommunication"
                                   With --telecommunications--

Column 13, line 62      Replace "an"
                                   With --and--

Column 14, line 62      Replace "requested"
                                   With --request--

Column 16, line 26      Replace "there;"
                                   With --therein;--

Column 16, line 47      Replace "requested"
                                   With --request--

Column 17, line 30      Replace "lease"
                                   With --least--

UNITED STATES PATENT AND TRADEMARK OFFICE
CERTIFICATE OF CORRECTION

PATENT NO.   : 5,623,532
DATED        : Apr. 22, 1997
INVENTOR(S)  : Houde et al.

It is certified that error appears in the above-identified patent and that said Letters Patent is hereby corrected as shown below:

Column 17, line 46    After "network;"
Insert as a new paragraph --a second signal transfer point associated with the slave home location register and also connected to the mobile telephone network;--

Signed and Sealed this

Tenth Day of February, 1998

Attest:

BRUCE LEHMAN

Attesting Officer    Commissioner of Patents and Trademarks